(12) United States Patent
Hayashi

(10) Patent No.: US 6,669,592 B2
(45) Date of Patent: Dec. 30, 2003

(54) FRICTIONAL TRANSMISSION BELT AND BELT-TYPE TRANSMISSION UNIT USING THE SAME

(75) Inventor: Takehiro Hayashi, Kobe (JP)

(73) Assignee: Bando Chemical Industries, Ltd., Hyogo (JP)

(*) Notice: Subject to any disclaimer, the term of this patent is extended or adjusted under 35 U.S.C. 154(b) by 15 days.

(21) Appl. No.: 09/822,463

(22) Filed: Apr. 2, 2001

(65) Prior Publication Data
US 2001/0029216 A1 Oct. 11, 2001

(30) Foreign Application Priority Data

Apr. 5, 2000 (JP) ............................. 2000-103442

(51) Int. Cl.[7] .................................................. F16G 1/04
(52) U.S. Cl. .................................... 474/268; 474/260
(58) Field of Search ................................. 474/252, 260, 474/265, 268

(56) References Cited

U.S. PATENT DOCUMENTS

| 2,184,545 A | | 12/1939 | Collier | |
|---|---|---|---|---|
| 4,222,809 A | * | 9/1980 | McLean et al. | 156/267 |
| 4,892,510 A | * | 1/1990 | Matsuoka et al. | 474/252 |
| 5,405,296 A | * | 4/1995 | Cerny et al. | 464/89 |
| 6,419,775 B1 | * | 7/2002 | Gibson et al. | 156/137 |

FOREIGN PATENT DOCUMENTS

| JP | 55-110854 A | 8/1980 |
|---|---|---|
| JP | 58-168536 A | 10/1983 |
| JP | 10-038032 A | 2/1998 |
| JP | 11-236959 A | 2/1998 |
| JP | 10-060179 A | 3/1998 |
| JP | 11-236587 A | 8/1999 |

* cited by examiner

Primary Examiner—Thomas R. Hannon
Assistant Examiner—Vicky A. Johnson
(74) Attorney, Agent, or Firm—Nixon Peabody, LLP

(57) ABSTRACT

A frictional transmission belt looped over V-ribbed pulleys for torque transmission. The V-ribbed pulleys are coated with anticorrosive paint prior to shipment of an automobile. A surface-active layer 7 made of a surfactant is formed on surfaces of ribs 1a on a belt body 1. With the existence of the surface-active layer, generation of an abnormal sound due to stick slip is suppressed even when the anticorrosion paint has not come off, without impairing the belt transmission capability.

4 Claims, 8 Drawing Sheets

FIG. 4

|  | Abnormal sound level |
|---|---|
| Present invention | ◎ |
| Comparative example 1 | — |
| Comparative example 2 | △ |
| Comparative example 3 | △ |
| Comparative example 4 | △ |
| Comparative example 5 | ××  |

# FRICTIONAL TRANSMISSION BELT AND BELT-TYPE TRANSMISSION UNIT USING THE SAME

BACKGROUND OF THE INVENTION

The present invention relates to improvement of a frictional transmission belt used for a belt-type transmission unit such as a belt-type accessory drive unit for an automobile engine. More particularly, the present invention relates to measures taken to eliminate an abnormal sound generated due to stick slip between the belt and a pulley coated with anticorrosion paint.

For example, a pulley used for a belt-type accessory drive unit for an engine is coated with anticorrosion paint at an automobile manufacturing site prior to shipment of a manufactured automobile to protect the pulley from rust during the shipment of the automobile to the user. Some of the coating is so rough that the paint comes off by idling the automobile for about 20 to 30 minutes, for example.

In some cases, however, even such roughly coated paint has not sufficiently come off when the automobile is handed over to the user. This causes generation of an abnormal sound due to stick slip between the coated surface of the pulley and the belt, and thus the user may file a complaint about this abnormal sound.

The abnormal sound is generated probably because the anticorrosion paint is tacky and this tackiness causes increase in the coefficient of friction between the pulley and the belt.

Conventionally, therefore, a material effective in reducing the coefficient of friction is attached to the surface of the belt.

The above conventional measure actually reduces the coefficient of friction and thus suppresses generation of an abnormal sound. However, with the reduction in coefficient of friction, there arises a new problem of deteriorating the belt transmission capability that is an essential matter for the transmission unit.

SUMMARY OF THE INVENTION

An object of the present invention is providing a frictional transmission belt looped over a pulley coated with anticorrosion paint, which suppresses generation of an abnormal sound, while maintaining the transmission capability as the frictional transmission belt, by suppressing only the tackiness of the anticorrosion paint.

To attain the above object, the present invention is based on the findings that the abnormal sound is generated mainly because the coefficient of static friction out of the two types of coefficient of friction, the coefficient of static friction and the coefficient of kinetic friction, increases by the existence of the anticorrosion paint. The present invention therefore uses a surfactant to suppress the tackiness of the anticorrosion paint. In this way, only the coefficient of static friction is reduced while the coefficient of kinetic friction is substantially maintained.

Specifically, the present invention is directed to a frictional transmission belt looped over a plurality of pulleys movably for torque transmission between the pulleys, wherein a surface-active layer made of a surfactant is formed on the surface of a belt body coming in contact with the pulleys.

When the frictional transmission belt looped over a plurality of pulleys runs between the pulleys, an abnormal sound will be generated due to stick slip between the frictional transmission belt and the pulleys if the surfaces of the pulleys coming in contact with the frictional transmission belt are coated with anticorrosion paint. The cause of this generation of an abnormal sound is considered to be as follows. The anticorrosion paint is softened and becomes tacky as the temperature rises with the running of the belt. This tackiness of the paint causes increase in the coefficient of static friction between the pulleys and the frictional transmission belt. As a result, stick slip occurs between the pulleys and the frictional transmission belt, and also the slip rate abruptly changes with a variation in the load of the frictional transmission belt on the pulleys. According to the present invention, the tackiness of the anticorrosion paint can be suppressed by the existence of the surface-active layer of the frictional transmission belt. This reduces the coefficient of static friction between the frictional transmission belt and the pulleys, and thus suppresses occurrence of stick slip between the frictional transmission belt and the pulleys. The surface-active layer hardly influences the coefficient of kinetic friction between the frictional transmission belt and the pulleys. Thus, generation of an abnormal sound is suppressed even when the anticorrosion paint has not yet come off, while the transmission capability of the frictional transmission belt is substantially maintained. This also provides a merit of smoothing the change of the slip rate with a variation in the load of the frictional transmission belt on the pulleys, as a spillover effect on the transmission characteristics.

The belt body may be a V-ribbed belt having a plurality of ribs each extending in a belt length direction arranged in order across a belt width on the surface of the belt facing the inside of the belt loop. Such a V-ribbed belt is normally used as the frictional transmission belt of a belt-type accessory drive unit for an automobile engine, and pulleys for the belt-type accessory drive unit are coated with anticorrosion paint prior to shipment from an automobile manufacturing site. In this occasion, therefore, the surface-active layer according to the present invention can practically act on the anticorrosion paint on the pulleys.

The surface-active layer may be formed by attaching a powdery surfactant to the belt body. With this construction, the surface-active layer, which is a powdery surfactant (for example, hand-washing powder soap) attached to the belt body, can be easily formed on the surface of the belt body coming in contact with the pulleys.

The belt-type transmission unit using the frictional transmission belt described above may be a transmission unit including the frictional transmission belt and a plurality of pulleys over which the frictional transmission belt is looped movably, wherein a surface of at least one of the plurality of pulleys coming in contact with the frictional transmission belt is coated with anticorrosion paint. In this belt-type transmission unit, the frictional transmission belt looped over the plurality of the pulleys runs between the pulleys, and by this running, torque is transmitted between the pulleys. Conventionally, the belt-contact surface of the at least one pulley coated with anticorrosion paint tends to generate an abnormal sound due to stick slip caused by the anticorrosion paint. According to the present invention, however, since the frictional transmission belt has a surface-active layer on the surface of the belt body coming in contact with the pulleys, generation of such an abnormal sound is suppressed.

BRIEF DESCRIPTION OF THE DRAWINGS

FIG. 4 is a table showing the overall results of sensory evaluation of sound levels obtained in the second test.

DESCRIPTION OF THE PREFERRED EMBODIMENTS

Hereinafter, an embodiment of the present invention will be described with reference to the accompanying drawings.

Figure 1:
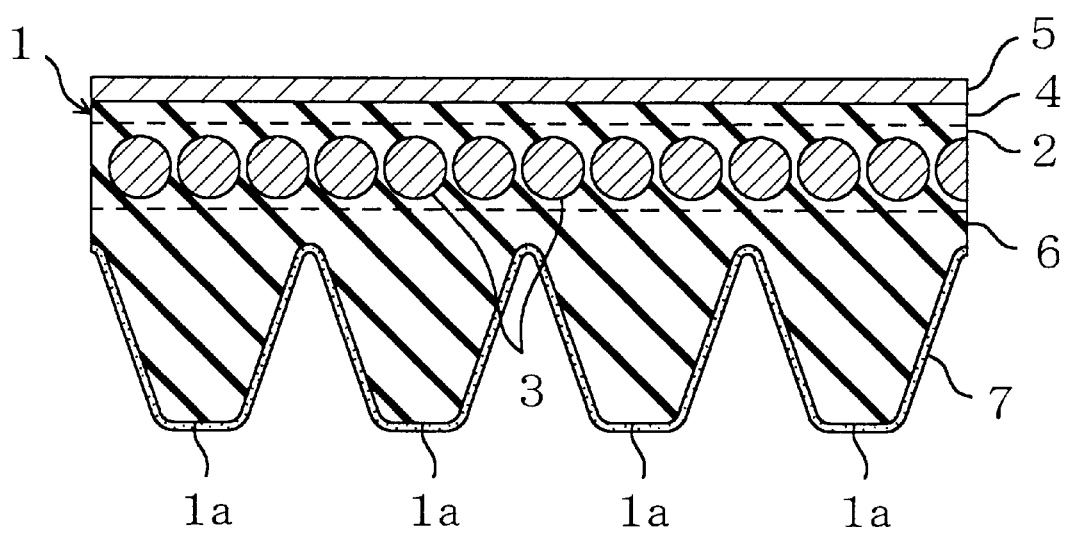
FIG. 1 is an enlarged schematic cross-sectional view of a V-ribbed belt of an embodiment of the present invention.
Figure 2:
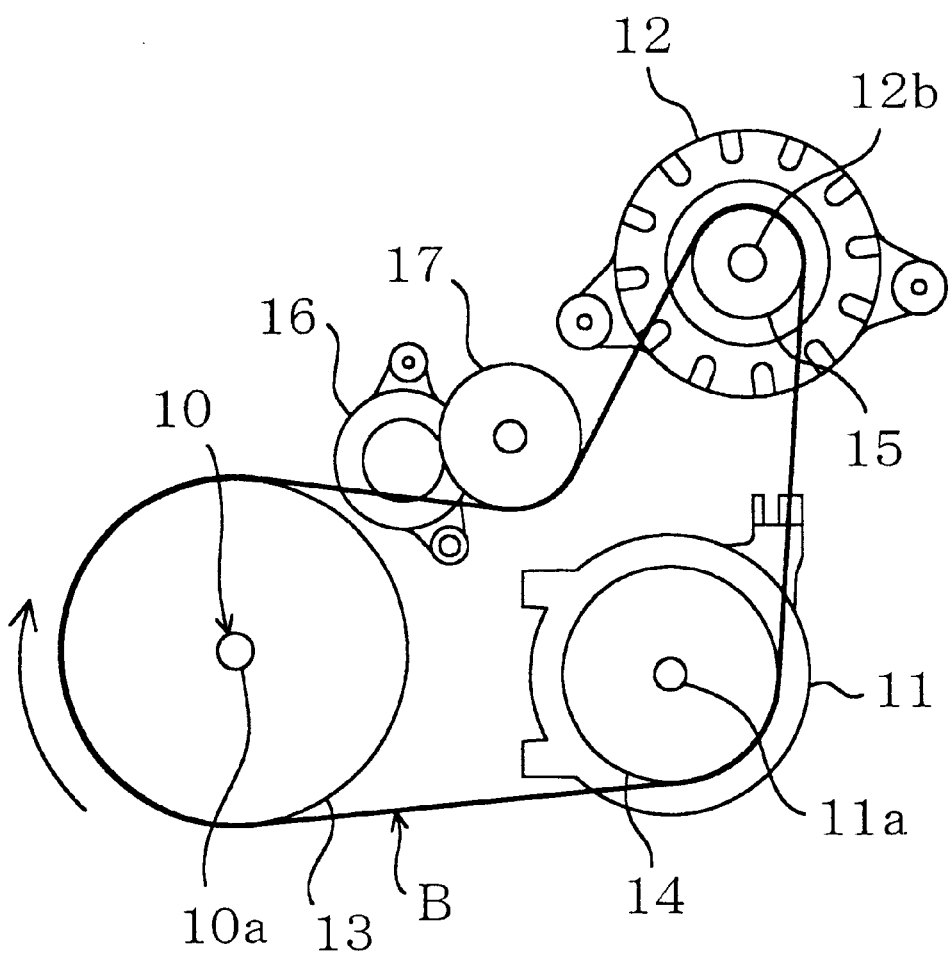
FIG. 2 is a schematic front elevation of a layout of a belt-type accessory drive unit for an automobile engine.

FIG. 1 illustrates the construction of a V-ribbed belt of an embodiment of the present invention. The V-ribbed belt of this embodiment is used for a belt-type accessory drive unit for an automobile engine as shown in FIG. 2 for transmitting torque of the engine to its accessories.

The belt-type accessory drive unit will be described with reference to FIG. 2. In the vicinity of an engine 10, an air conditioner compressor 11 and an alternator 12 are disposed as accessories. A driving pulley 13 is coupled to a crank shaft 10a of the engine 10 so as to rotate together with the crank shaft 10a. Driven pulleys 14 and 15 are coupled to rotation axes 11a and 12a of the compressor 11 and the alternator 12 so as to rotate together with the axes 11a and 12a. The pulleys 13 to 15 are all V-ribbed pulleys coated with anticorrosion paint. The V-ribbed belt, denoted by B in FIG. 2, is looped over the pulleys 13 to 15. A tensioner 16 is disposed near the engine 10 to impart a tension to the V-ribbed belt B by pressing the surface of the belt facing the outside of the belt loop with a tension pulley 17.

The V-ribbed belt B includes a belt body 1 having a predetermined length (for example, 1,174 mm) and a plurality of ribs 1a, 1a, . . . (for example, six ribs) having a roughly V-shaped section each extending in the belt length direction arranged at equal intervals across the belt width (laterally as is viewed from FIG. 1) on the surface of the belt body 1 facing the inside of the belt loop.

Specifically, the belt body 1 includes a cushion rubber layer 2 having a rectangular section in which belt cords 3 are buried. A top rubber layer 4 is formed on the surface of the cushion rubber layer 2 facing the outside of the belt loop (top surface as is viewed from FIG. 1), and a canvas layer 5 is formed on the surface of the top rubber layer 4 facing the outside of the belt loop. A rib rubber layer 6 is formed on the other surface of the cushion rubber layer 2 facing the inside of the belt loop. The ribs 1a, 1a, . . . are formed on the surface of the rib rubber layer 6 facing the inside of the belt loop.

In this embodiment, a surface-active layer 7 made of a surfactant is formed on the surface of the belt body 1 facing the inside of the belt loop that comes in contact with the pulleys 13 to 15, that is, on the surface of each rib 1a.

Specifically, the surface-active layer 7 is made of a powder surfactant, "powder Hand Soap (product name)" (manufactured by BORAXO in the U.S.), which is attached to the surface of each rib 1a by rubbing the surface with the surfactant.

Four tests were performed to examine the characteristics of the V-ribbed belt B, which are described in order as follows. Note that the V-ribbed belt used in the respective tests is 1,174 mm long and has six ribs.

First Test

An abnormal sound test was performed for an automobile using V-ribbed pulleys coated with anticorrosion paint for a belt-type accessory drive unit for an automobile engine. The procedure for this test is as follows.

V-ribbed pulleys coated with anticorrosive paint and a V-ribbed belt were assembled together to provide a belt-type accessory drive unit for an automobile engine, and the engine was started. Idling rotation and 2500 rpm rotation were alternately repeated for five minutes each, allowing the belt to run for a total of 50 minutes. During the running, the sensory evaluation of an abnormal sound was performed every five minutes including immediately after the start on a scale of five levels, "high", "middle", "low", "minute", and "none". The results are shown as ◇ marks in FIG. 3.

Figure 3:
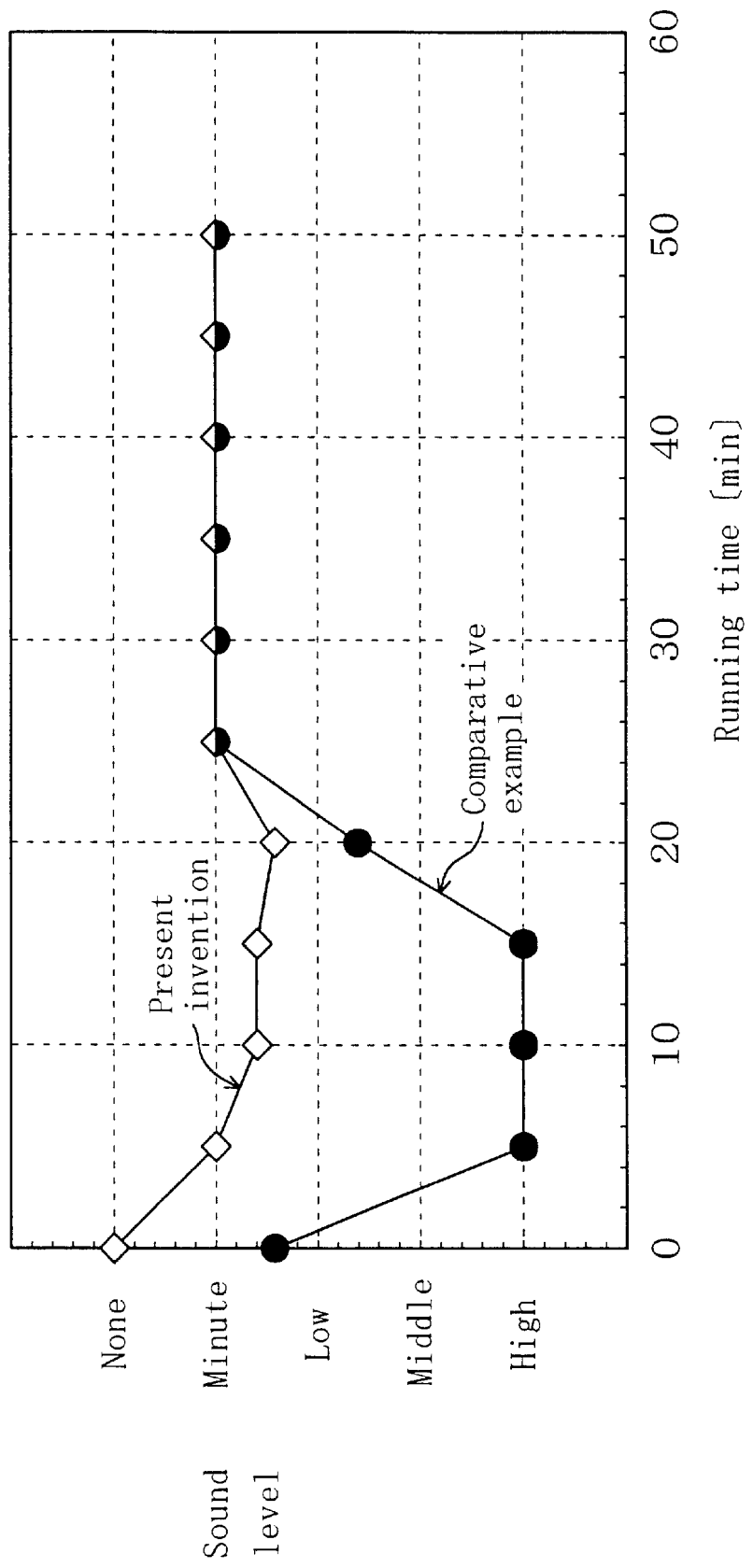
FIG. 3 is a characteristic view showing the sound levels with respect to the belt running time in an example of the present invention and a comparative example, obtained in the first test.

For comparison, the same abnormal sound test was performed for a conventional V-ribbed belt having no surface-active layer as a comparative example. The results are shown as ● marks in FIG. 3. In FIG. 3, the mark composed of a white triangular upper half and a black semicircular lower half represents that the evaluation results of the example of the present invention and the comparative example match with each other.

The results of the comparative example will first be examined. As is found from FIG. 3, the sound level, which is slightly high at the start of the belt running, exhibits sharp rise five minutes after the start. After a lapse of 15 minutes, the sound level drops sharply, and stabilizes at a roughly constant level after a lapse of 25 minutes. This indicates that the abnormal sound is generated as the anticorrosion paint becomes tacky with temperature rise and ceases as the anticorrosion paint comes off with the belt running. The surface coated with the anticorrosion paint was lusterless and had a smooth feeling at the time immediately after the start. As the sound level rose, the surface became luster and changed to a sticky feeling. With the drop of the sound level, the paint came off.

On the contrary, in the example of the present invention, although the sound level gradually increased from the start of the belt running, it never exceeded the level in the comparative example at the time immediately after the belt running. The sound level started dropping after a lapse of 20 minutes, and stabilized at the same level as that in the comparative example after a lapse of 25 minutes.

From the above results, it is found that although a slightly longer time is required until the anticorrosion paint has come off, the abnormal sound level observed before the anticorrosion paint has come off is roughly as low as the level obtained after the coming-off of the anticorrosion paint.

Second Test

The automobile used in the first test was actually driven to perform a sound test in the following procedure.

The automobile equipped with the V-ribbed belt of the present invention was driven in a city at a speed of 55 km/h for a distance of 16 km. During the driving, the sound sensory evaluation was performed every running of about 1.5 km including immediately before the start on a scale of five levels, "⊚ (greatly improved)", "○ (improved)", "-(no improvement)", "Δ (worsened)", and "X (greatly worsened)". The results are shown in FIG. 4.

For comparison with the above example of the present invention, V-ribbed belts to which five different chemicals were attached (comparative examples 1 to 5) were prepared and subjected to the same test. In comparative example 1, "KM722A (product name)" (a silicone spray made of water-soluble emulsion manufactured by Shin-Etsu Silicone Co., Ltd.) was used. In comparative example 2, "MS-122DF (product name)" (a Teflon (registered trade mark) spray manufactured by Miller-Stephenson Chemical Company) was used. In comparative example 3, "CRC Power Lube (product name)" (an anticorrosion spray manufactured by CRC) was used. In comparative example 4, "STP Belt Dressing (product name)" (a spray manufactured by STP) was used. In comparative example 5, "Rain-X (product name)" (a spray manufactured by Blue Coral-Slick 50) was used. The results are also shown in FIG. 4.

As is found from FIG. 4, a highly significant effect of reducing an abnormal sound was obtained in the example of the present invention. On the contrary, the abnormal sound level exhibited no improvement in comparative example 1. This was the best result. In comparative examples 2 to 5, the abnormal sound level was rather worsened. In particular, it was extremely worsened in comparative example 5.

Third Test

A test was performed to measure the coefficient of friction between the V-ribbed belt of this embodiment and V-ribbed pulleys without coating of anticorrosion paint. Note that this measurement was not performed for V-ribbed pulleys coated with anticorrosion paint.

Figure 5:
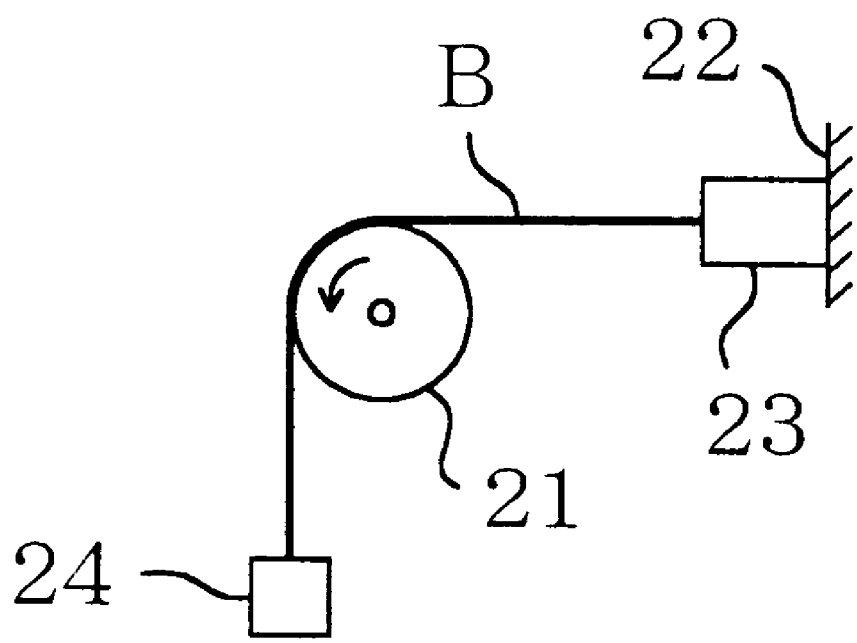
FIG. 5 is a schematic view illustrating the procedure of the third test.

In this test, measured were the coefficient of static friction as the main factor of generation of an abnormal sound and the coefficient of kinetic friction as the main factor of the belt transmission capability. The common procedure for this test is as schematically shown in FIG. 5. That is, a portion of the V-ribbed belt B along the belt length is cut off, and the cut belt is hung over a V-ribbed pulley 21 having a diameter ø of 60 mm at the middle of the belt length. One end of the belt is stretched horizontally and coupled to a load cell 23 secured to a fixed body 22. A load 24 is applied to the other end of the belt so as to secure a contact angle θ of 90° between the V-ribbed belt B and the V-ribbed pulley 21. In this state, the V-ribbed pulley 21 is rotated in the direction in which a tension is applied to the horizontal portion of the V-ribbed belt B (counterclockwise as is viewed from FIG. 5), and the value of the load cell 23 is read.

In the case of measuring the coefficient of static friction, a constant driving force was applied to the V-ribbed pulley 21 while the load 24 was varied. The value of the load cell 23 at the moment at which the V-ribbed pulley 21 just started rotating, that is, slip occurred between the V-ribbed belt B and the V-ribbed pulley 21, was read. The driving force was actually applied in the following manner. The V-ribbed pulley 21 was coupled with a cylindrical drum to be rotatable with the drum. A thread was wound around the cylindrical drum with one end of the thread attached to the drum. A predetermined load was applied to the other end of the thread.

In the case of measuring the coefficient of kinetic friction, the load 24 was stabilized at 17.15 N (≈1.75 kgf), and the V-ribbed pulley 21 was rotated at a rotational speed (slip speed) in the range of 0.05 to 0.35 m/sec with an electric motor. The load cell 23 was read during the slipping of the V-ribbed belt B on the V-ribbed pulley 21. The "slip speed" refers to the difference in relative rotational speed between the pulley and the belt generated by torque transmission therebetween, and is generally set by multiplying the rotational speed of an engine by a constant coefficient. In this test, the slip speed of 0.135 m/sec is set to roughly correspond to the engine rotational speed of 1000 rpm.

For calculation of the coefficient of friction $\mu$ based on the value read on the load cell 23, the following equation was used for both the coefficient of static friction and the coefficient of kinetic friction.

$$\mu = 2 \div \pi \times \ln (\text{read value} \div 1.75)$$

wherein π denotes the ratio of the circumference of a circle to its diameter, and ln denotes the natural logarithm having a base e.

Figure 6:
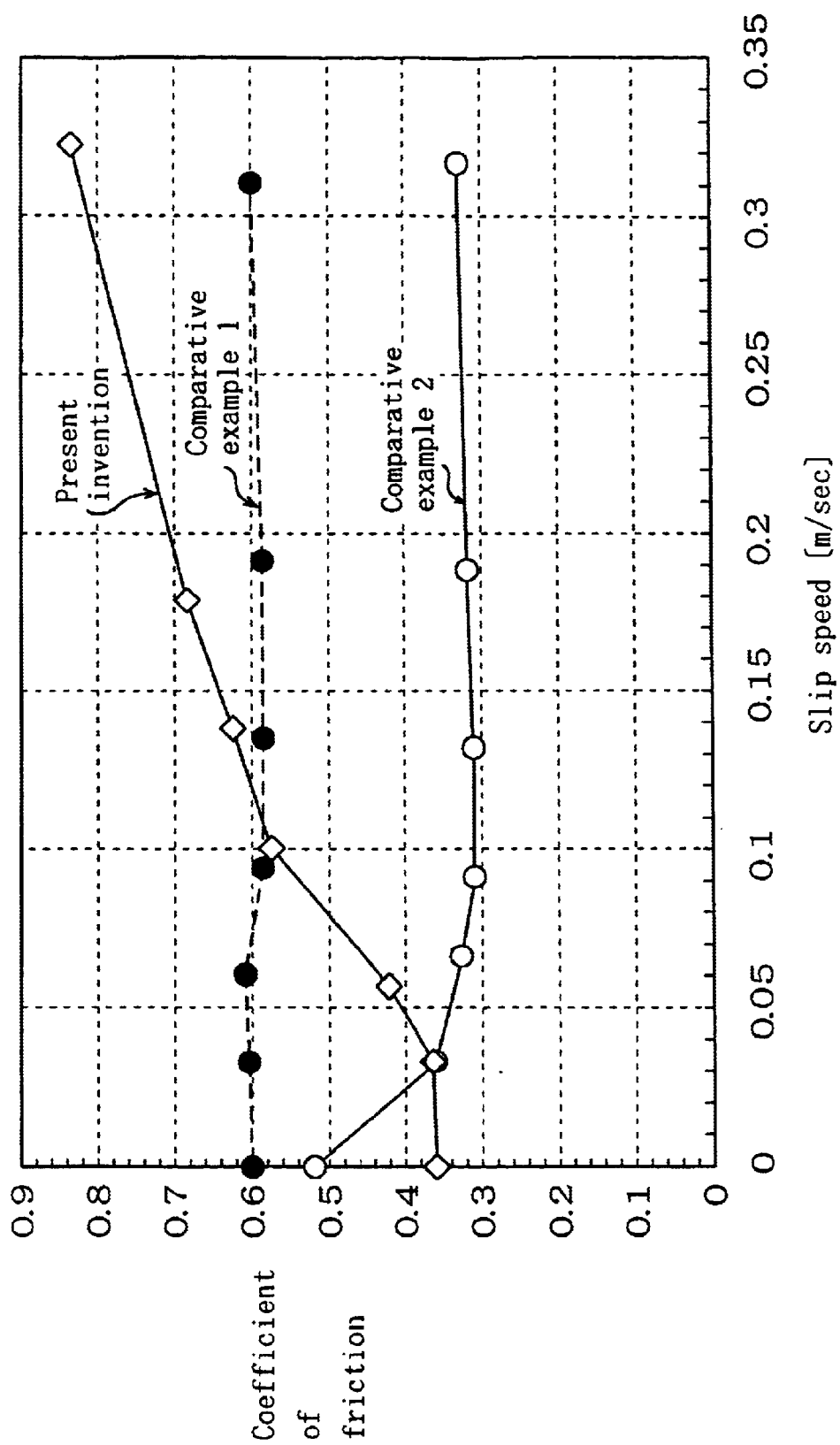
FIG. 6 is a characteristic view showing the coefficients of friction with respect to the slip speed in an example of the present invention and comparative examples, obtained in the third test.

The measurement results are shown in FIG. 6, where the coefficient of friction observed at the slip speed of 0 represents the coefficient of static friction, while that observed in the range of the slip speed exceeding 0 represents the coefficient of kinetic friction.

For comparison, the above test was performed for a conventional V-ribbed belt as comparative example 1 and the V-ribbed belt used as comparative example 1 in the second test (a silicone spray attached) as comparative example 2. The coefficient of static friction and the coefficient of kinetic friction were measured for these comparative examples, and the results are also shown in FIG. 6.

As is found from FIG. 6, the coefficient of static friction was about 0.36 in the example of the present invention while it was about 0.6 in comparative example 1, indicating that the former is as small as about 60% of the latter. The coefficient of static friction was about 0.52 in comparative example 2, indicating that the coefficient of static friction in comparative example 2 is only as small as about 86% of that in comparative example 1. From the above findings, it is presumed that the coefficient of static friction will be sufficiently reduced even for a V-ribbed pulley coated with anticorrosion paint according to the present invention.

As for the coefficient of kinetic friction, in comparison with comparative example 1, the coefficient of kinetic friction in the example of the present invention is smaller in the range of the slip speed of about 0.1 m/sec or less, but it is larger in the range of the slip speed exceeding 0.1 m/sec. For example, at the slip speed of 0.135 m/sec roughly corresponding to the engine rotational speed of 1000 rpm, the coefficient of kinetic friction is about 0.62 in the example of the present invention while it is about 0.59 in comparative example 1. That is, the present invention can provide at least the same level of coefficient of kinetic friction as comparative example 1. In comparative example 2, the coefficient of kinetic friction is always smaller than that in comparative example 1. For example, it is about 0.32 at the slip speed of 0.135 m/sec.

Fourth Test

A test was performed to examine the relationship between the load applied to the belt and the belt slip rate for clarification of the transmission characteristics other than the transmission capability examined in the third test. The procedure for the test is as follows.

Figure 7:
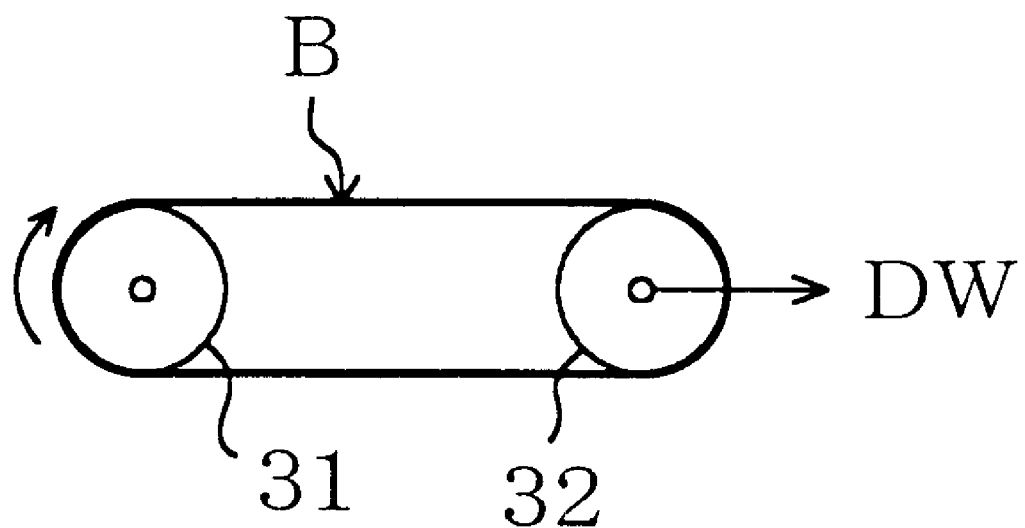
FIG. 7 is a schematic view illustrating the procedure of the fourth test.

As schematically shown in FIG. 7, the V-ribbed belt B of this embodiment was looped over two V-ribbed pulleys 31 and 32 having a diameter ø of 100 mm. While one of the pulleys (the pulley 31 on the left in FIG. 7) was rotated, a dead weight (DW=392 N (≈40 kgf)) was applied to the other pulley (the pulley 32 on the right) in the direction in which the distance between the axes of the pulleys 31 and 32 increased (rightward as is viewed from FIG. 7). In this state, the slip rate (unit: %) with respect to the load (unit: kW (1 kW≈1.35962PS)) was measured.

Figure 8:
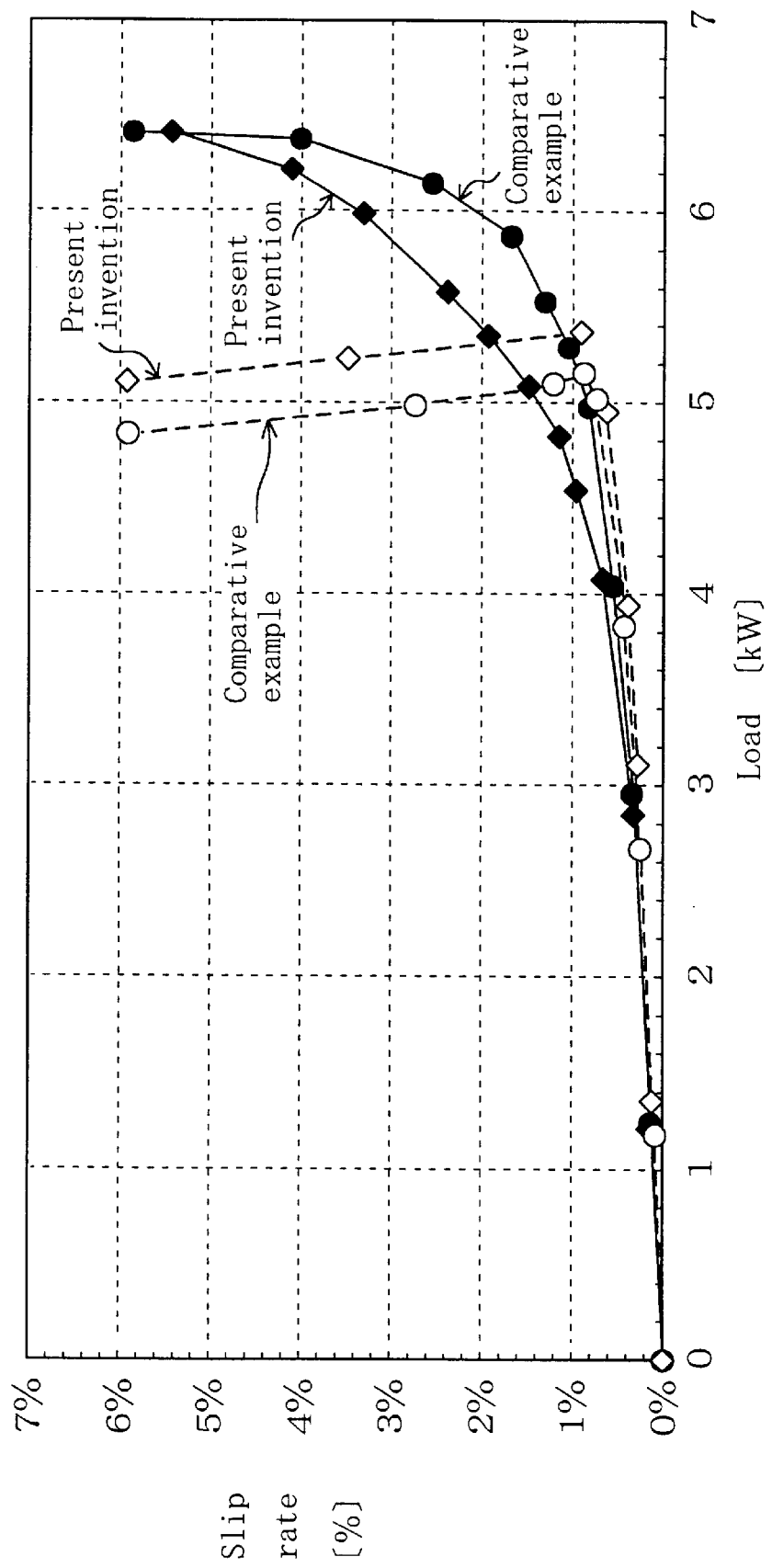
FIG. 8 is a characteristic view showing the slip rates with respect to the load in an example of the present invention and comparative examples, obtained in the fourth test.

The slip rate was measured under the dry conditions and the wet conditions. The wet conditions were created by dropping 200 cc/min of water to the pulley 31 on the driving side after a 30-minute nonloaded break-in. The results are shown in FIG. 8, in which the ◆ and ◇ marks represent the results obtained under the dry conditions and the wet conditions, respectively. In FIG. 8, the region of the graph where the characteristic curves extend along the axis of abscissa corresponds to an elastic slip region where the slip generated is due to elastic elongation of the belt (elastic slip), while the region where the characteristic curves extend along the axis of ordinates corresponds to a sliding slip region where the slip generated is due to overloading (sliding slip).

For comparison, the slip rate with respect to the load was measured for a conventional V-ribbed belt (comparative example). The results are also shown in FIG. 8 using the ● and ○ marks representing the results obtained under the dry conditions and the wet conditions, respectively.

As is found from FIG. 8, under the dry conditions, the slip rate in the example of the present invention changes more smoothly than that in the comparative example in a curve-change region between the elastic slip region and the sliding slip region where the tilt of the characteristic curve changes. This is presumably because the coefficient of static friction is smaller in the example of the present invention than in the comparative example.

As for the transmission characteristic under the wet conditions, the example of the present invention is found as good as or better than the comparative example.

Thus, according to the present invention, in the belt-type accessory drive unit for an automobile engine, the surface-active layer 7 is formed on the rib surfaces of the belt body 1 of the V-ribbed belt B looped over the V-ribbed pulleys 13 to 15 that are coated with anticorrosion paint for rust prevention during shipment. This makes it possible to suppress generation of an abnormal sound due to stick slip even when the anticorrosion paint has not come off, without impairing the transmission capability of the belt.

In the above embodiment, the surface-active layer 7 is formed by rubbing the surface of the belt body 1 with a powdery surfactant. The type and shape of the surfactant and the method of forming the surface-active layer are not specified. For example, a liquid surfactant may be applied to the surface of the belt body.

In the above example, the surface-active layer 7 is formed over the entire surface of the belt facing the inside of the belt loop. Alternatively, although main consideration should be given to the portion of the belt surface coming in contact with the pulleys, the area of the formation of the surface-active layer 7 can be appropriately determined depending on the requirements such as the degree to which generation of the abnormal sound should be suppressed and the easiness of the formation of the layer.

In the above embodiment, the V-ribbed belt having six ribs 1a, 1a, ... was exemplified. The present invention is also applicable to a V-ribbed belt having five ribs or less or seven ribs or more and a frictional transmission belt of a type other than the V-ribbed belt.

The above embodiment describes the application to the belt-type accessory drive unit for an automobile engine. The present invention is also applicable to other belt-type transmission units.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A frictional transmission belt looped over a plurality of pulleys movably for torque transmission between the pulleys, wherein a surface-active layer made of a powdery surfactant is formed on substantially the entire surface of a belt body coming in contact with the pulleys, and increases the coefficient of kinetic friction in a range of slip speed exceeding 0.1 m/sec while reducing the coefficient of static friction.

2. The frictional transmission belt of claim 1, wherein the belt body is a V-ribbed belt having a plurality of ribs each extending in a belt length direction arranged in order across a belt width on a surface of the belt facing the inside of the belt loop.

3. A belt-type transmission unit using the frictional transmission belt of claim 1, comprising:

a plurality of pulleys; and the frictional transmission belt movably looped over the plurality of pulleys, wherein a surface of at least one of the plurality of pulleys coming in contact with the frictional transmission belt is coated with anticorrosion paint.

4. A belt-type transmission unit using the frictional transmission belt of claim 1, wherein the powdery surfactant is a powder hand soap.

* * * * *